(12) United States Patent
Tanaka

(10) Patent No.: US 6,643,249 B2
(45) Date of Patent: Nov. 4, 2003

(54) DISC EJECTING APPARATUS

(75) Inventor: Shinsaku Tanaka, Tokyo (JP)

(73) Assignee: Tanashin Denki Co., Ltd., Tokyo (JP)

( * ) Notice: Subject to any disclaimer, the term of this patent is extended or adjusted under 35 U.S.C. 154(b) by 122 days.

(21) Appl. No.: 09/870,773

(22) Filed: Jun. 1, 2001

(65) Prior Publication Data

US 2001/0050898 A1 Dec. 13, 2001

(30) Foreign Application Priority Data

Jun. 7, 2000 (JP) ........................................ 2000-170818

(51) Int. Cl.[7] ................................................ G11B 17/04
(52) U.S. Cl. ...................................... 369/219; 369/75.2
(58) Field of Search .............................. 369/219, 75.2, 369/77.2, 71, 271, 192, 30.85, 191

(56) References Cited

U.S. PATENT DOCUMENTS

| | | | | |
|---|---|---|---|---|
| 4,759,008 A | * | 7/1988 | Hirano et al. ............... 369/75.2 |
| 5,237,555 A | * | 8/1993 | Tsuruta et al. ............... 369/77.2 |
| 5,239,532 A | * | 8/1993 | Hensing et al. ................ 369/71 |
| 5,615,196 A | * | 3/1997 | Kato ............................. 369/271 |
| 5,748,606 A | * | 5/1998 | Nakagawa et al. .......... 369/192 |
| 6,310,853 B1 | * | 10/2001 | Ito ............................. 369/30.85 |
| 6,466,524 B1 | * | 10/2002 | Fujimoto .................. 369/30.85 |
| 6,480,458 B1 | * | 11/2002 | Konno et al. ............... 369/219 |
| 6,490,123 B1 | * | 12/2002 | Iwakura et al. ........... 360/97.01 |

FOREIGN PATENT DOCUMENTS

| | | |
|---|---|---|
| JP | 2000-11511 | 1/2000 |
| JP | 2000-298903 | 10/2000 |

* cited by examiner

Primary Examiner—Brian E. Miller
(74) Attorney, Agent, or Firm—Jones, Tullar & Cooper, P.C.

(57) ABSTRACT

The present invention relates to a disc ejecting apparatus for ejecting a disc by utilizing a pick-up drive motor. It is proposed to simplify the construction of the disc ejecting apparatus. A slip mechanism is provided in a route leading from the pick-up drive motor to a pick-up, and in the last stage of restoration of the pick-up to an initial position the disc ejecting mechanism is connected to the pick-up drive motor.

3 Claims, 5 Drawing Sheets

US 6,643,249 B2

DISC EJECTING APPARATUS

BACKGROUND OF THE INVENTION

1. Field of the Invention

This invention relates to a disc ejecting apparatus for ejecting a disc by utilizing a pick-up drive motor.

2. Description of the Prior Art

Among disc ejecting apparatuses for ejecting a disc by utilizing a pick-up drive motor is one in which the torque of a pick-up drive motor is selectively transmitted to a pick-up and a disc ejecting mechanism.

The disc ejecting apparatus having such a construction should comprise a power transmission route switching mechanism for selectively transmitting the torque of the disc drive motor to the pick-up and the disc ejecting mechanism and a drive source such as a plunger for driving the switching mechanism. Therefore, it has a problem that its construction is complicated.

The invention was made in order to solve the above problem, and it has an object of providing a disc ejecting apparatus by utilizing a pick-up drive motor, which dispenses with the power transmission route switching mechanism and the drive source for driving the same and is simplified in construction.

SUMMARY OF THE INVENTION

In the disc ejecting apparatus according to the invention, a slip mechanism is provided in a first power transmission route leading from a pick-up drive motor to a pick-up, and in the last stage of restoration of the pick-up to the initial position by the pick-up drive motor a disc ejecting mechanism is connected to the pick-up drive motor for disc ejection therewith while providing a slip action of the slip mechanism.

Also, an excess load absorbing mechanism for cutting off the power transmission when experiencing a load in excess of the load in the slip mechanism is provided in another second power transmission route leading from the pick-up drive motor to the disc ejecting mechanism. With this arrangement, when it is intended to irrationally stop the disc ejection, the excess load absorbing mechanism can absorb the torque of the pick-up drive motor to prevent damage to the system.

Furthermore, a high voltage supply means for supplying a high voltage to the pick-up drive motor in response to an eject commanding operation is provided. With this arrangement, upon an eject commanding operation the motor can be driven at an increased high speed for quick disc ejection.

With the slip mechanism provided in the power transmission route leading from the pick-up drive motor to the pick-up, the torque of the pick-up drive motor can be selectively transmitted to the disc ejecting mechanism. When an eject commanding operation is done, the pick-up drive motor is started to cause movement of the pick-up to the initial position. In the last stage of the pick-up restoring operation, by the movement of the pick-up support a switching gear is brought into mesh with a worm gear to connect the disc ejecting mechanism to the pick-up drive motor. Thus, it is possible to perform the disc ejection by the disc ejecting mechanism owing to the slip action of the slip mechanism.

As in the present invention, the excess load absorbing mechanism is provided in the second power transmission route from the pick-up drive motor to the disc ejecting mechanism for cutting off the power transmission when experiencing a load in excess of the load in the slip mechanism. When it is intended to irrationally stop the disc ejection, the excess load absorbing mechanism absorbs the torque of the pick-up drive motor to prevent damage to the system.

Moreover, with the provision of the high voltage supply means for supplying a high voltage to the pick-up drive motor in response to an eject commanding operation, the motor is driven at an increased high speed upon the disc ejecting operation to quickly perform the restoration of the pick-up to the initial position and the disc ejection.

BRIEF DESCRIPTION OF THE DRAWINGS

These and other objects, features and advantages of the invention will become more apparent upon reading of the following detailed specification and drawings, in which.

DETAILED DESCRIPTION OF THE PREFERRED EMBODIMENTS

Figure 1:
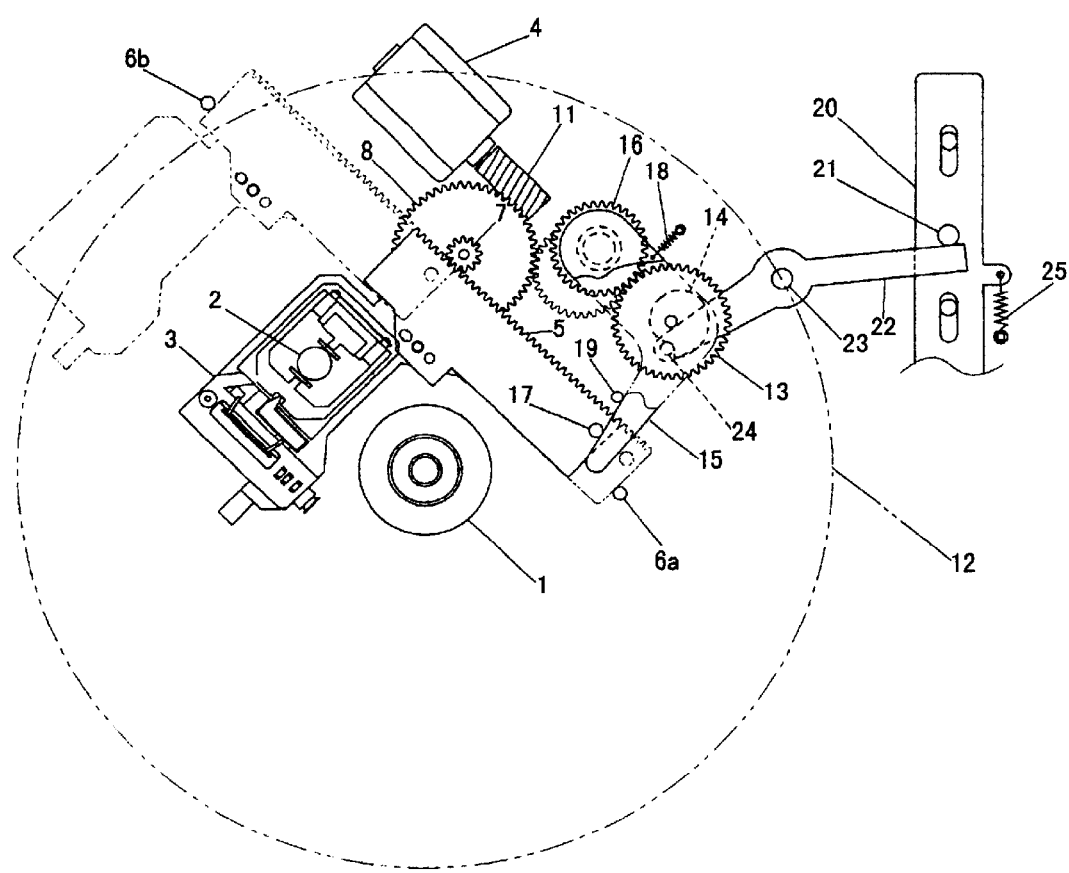
FIG. 1 is a schematic plan view showing an embodiment of the disc ejecting apparatus according to the invention.
Figure 2:
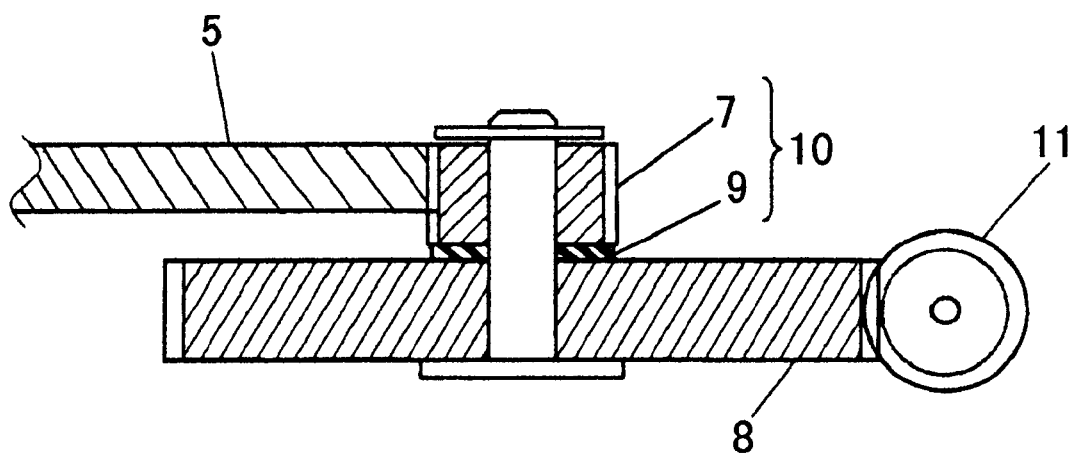
FIG. 2 is a schematic sectional view showing a part of the same embodiment.
Figure 3:
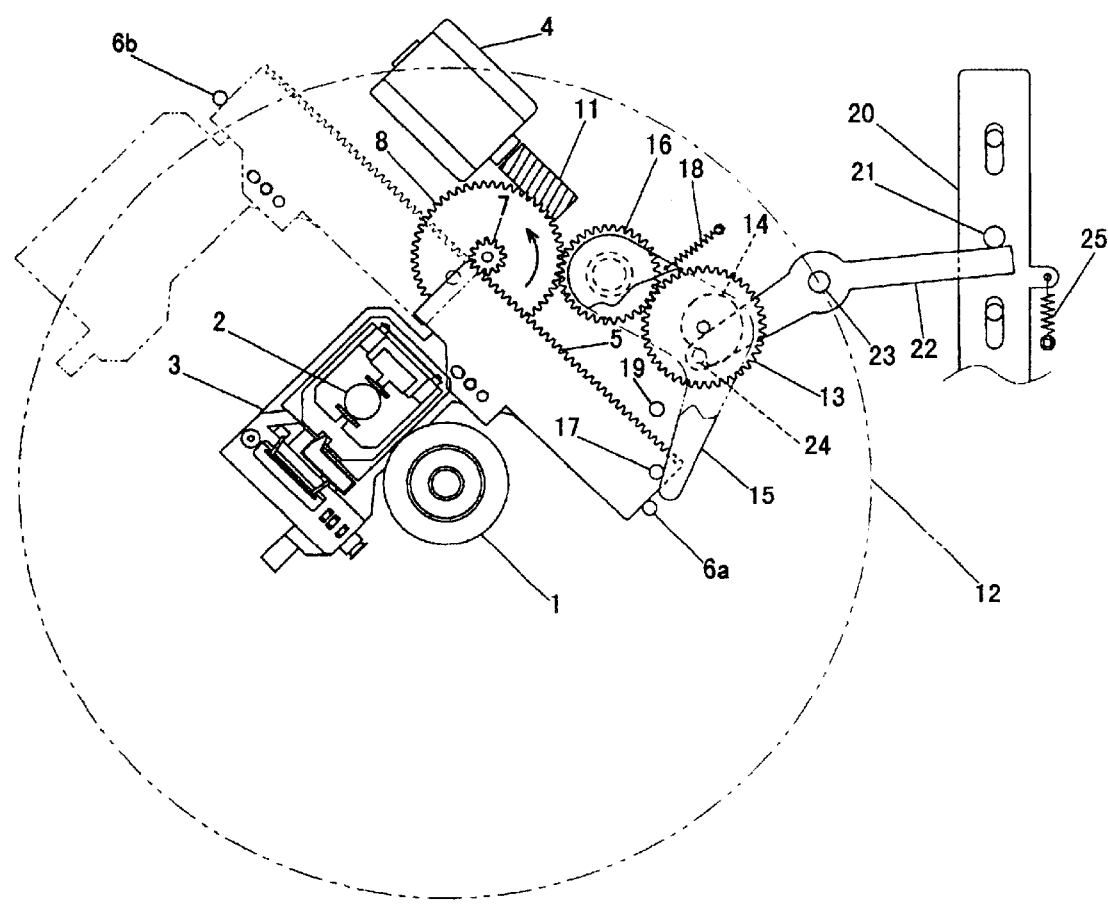
FIG. 3 is a schematic plan view showing the same embodiment in an operating state.

FIGS. 1 to 3 show an embodiment of the disc ejecting apparatus according to the invention. FIG. 1 is a schematic plan view showing a disc player with the disc ejecting apparatus. In the figures, reference numeral 1 designates a turntable, numeral 2 designates a pick-up, numeral 3 designates a pick-up support reciprocally moved with the pick-up supported thereon, and numeral 4 designates a pick-up drive motor.

The turntable 1 is driven for rotation by a turntable drive motor (not shown). The pick-up support 3 has a rack 5 formed as a part of it, and is reciprocally moved along a straight orbit between stoppers 6a and 6b. A pinion 7 and a worm gear 8 are disposed coaxially near the rack 5. The pinion 7 is in mesh with the rack 5. As shown in FIG. 2, a friction sheet 9 is inserted between the pinion 7 and the worm gear 8. The pinion 7 and the friction sheet 9 together constitute the slip mechanism 10. The slip mechanism 10 is provided in a first power transmission route leading from the pick-up drive motor 4 to the pick-up 2. When the load on the side of the pick-up 2 exceeds a predetermined value, the slip mechanism 10 provides a slip action to cut off the power transmission.

The worm gear 8 is in mesh with a worm 11 secured to an axis of the pick-up drive motor 4. The torque of the motor 4 is transmitted to the pick-up support 3 through the worm 11, the worm gear 8, the slip mechanism 10 and the rack 5. When the motor 4 is driven to rotate in one direction, the pick-up 2 on the pick-up support 3 is driven along the recording surface of the disc 12 from the inner side of the disc 12 toward the outer side thereof. When the motor 4 is driven to rotate in the outer direction, the pick-up 2 is moved from the outer side of the disc 12 toward the inner side thereof.

The range of movement of the pick-up support 3 in the playback operation or the like, is set to be less than the maximum movement range, and the pick-up support 3 is not moved up to the end. In response to an eject commanding operation, the pick-up drive motor 4 is driven to cause movement of the pick-up support 3 to an initial position in which the pick-up support 3 is in contact with the stopper 6a, and is subsequently continually driven owing to the slip action caused between the pinion 7 and the friction sheet 9.

Reference numeral 13 designates a cam gear having a spiral cam 14 provided on the back side. A substantially L-shaped rocking member 15 has its bending portion rockaly supported on an axis supporting the cam gear 13. The rocking member 15 has one end portion supporting a switching gear 16, which is in mesh with the cam gear 13. With the rocking movement of the rocking member 15, the switching gear 16 is brought into mesh with or separated from the worm gear 8.

The rocking member 15 has the other end portion extending over the pick-up support 3. The pick-up support 3 has an urging pin 17 to be in forced contact with the other end portion of the rocking member 15. The rocking member 15 is biased by a restoring spring 18 for rocking in the clockwise direction, and its rocking movement in the biasing direction is restricted by a stopper 19.

Reference numeral 20 designates a slide member constituting part of a disc ejecting mechanism. The disc ejecting mechanism serves to eject the disc 12 with upward movement of the slide member 20 in the figures. The construction of this type of disc ejecting mechanism, however, is well known in the art and is not described. The slide member 20 has an engagement protuberance 21.

Reference numeral 22 is a coupling lever rockably supported on an axis 23. The coupling lever 22 has a cam follower pin 24 provided at one end and in contact with the spiral cam 14, and its other end faces the engagement protuberance 21 of the slide member 20. Reference numeral 25 in the figures designates a restoring spring biasing the slide member 20 in the restoring direction.

The operation of the disc ejecting apparatus having the above construction is as follows.

When an eject commanding operation is done while the playback is in force with the disc 12 loaded in the turntable 1, the pick-up drive motor 4 is driven to rotate thereby to move the pick-up 3 toward the initial position. The torque of the pick-up drive motor 4 is transmitted through the worm gear 8 and the slip mechanism 10 to the pick-up support 3 to cause movement of the pick-up 2 along the recording surface of the disc 12 from the outer side thereof toward the inner side.

As shown in FIG. 1 when the pick-up support 3 approaches the end position of movement, the urging pin 17 is brought into forced contact with the rocking member 15, which is thus pushed by the urging pin 17 and rocked in the counterclockwise direction. Unless an eject commanding operation is done, the pick-up support 3 no further approaches the stopper 6a in the normal playback operation.

As shown in FIG. 3, the rocking of the rocking member 15 in the counterclockwise direction brings the switching gear 16 into mesh with the worm gear 8, thus causing the pick-up support 3 to be brought into contact with and stopped by the stopper 6a.

The pick-up drive motor 4 is continually driven for rotation owing to the slip action brought about between the pinion 7 and the friction sheet 9, both of which constitute the slip mechanism 11. The torque of the pick-up drive motor 4 is transmitted through the worm gear 8 and the switching gear 16 to the cam gear 13, maintaining continual rotation thereof in the counterclockwise direction to cause the spiral cam 14 to push the cam follower pin 24 of the coupling lever 22 for rocking movement thereof in the counterclockwise direction. The coupling lever 22 thus pushes the engagement protuberance 21 of the slide member 20 upward in the figures to cause the disc ejection by the disc ejecting mechanism.

When the playback operation is commenced by loading the disc 12, the pick-up support 3 is moved toward the stopper 6b, causing the rocking member 15 to be restored by the spring 18 in the clockwise direction to separate the switching gear 16 from the worm gear 8.

As has been shown, in this disc ejecting apparatus the slip mechanism 10 is provided in the first power transmission route leading from the pick-up drive motor 4 to the pick-up 2, and the disc ejecting mechanism is connected to the pick-up drive motor 4 in the last stage of restoration of the pick-up 2 to the initial position. Thus, the provision of the power transmission route for switching the power transmission route is unnecessary. It is thus possible to simplify the construction.

Also, at the time of the commencement of the next playback operation, the second power transmission route leading from the pick-up drive motor 4 to the disc ejecting mechanism is automatically cut off with the movement of the pick-up support 2. Thus, it is not necessary to provide any mechanism for separating the disc ejecting mechanism from the motor 4.

Figure 4:
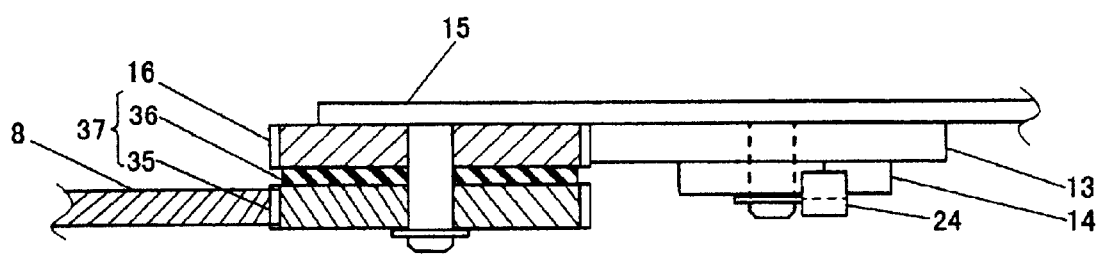
FIG. 4 is a schematic sectional view showing a modification of the same embodiment by adding an excess load absorbing mechanism thereto.

FIG. 4 shows a modification of the above embodiment obtained by adding an excess load absorbing mechanism thereto. In the figures, parts like those in the above embodiment are designated by like reference numerals.

In this modification, a gear 35 of the same diameter as the switching gear 16 is supported such that it is coaxial with and overlaps the switching gear 16. A friction sheet 36 is interposed between the two gears 16 and 35. The gear 35 and the friction sheet 36 together constitute an excess load absorbing mechanism 37. The gear 35 is brought into contact with and separated from the worm gear 8 with the rocking of the rocking member 15.

In the state with the gear 35 and the worm gear 8 in mesh with each other, the torque of the pick-up drive motor 4 is transmitted through the worm gear 8, the gear 35 and the switching gear 16 to the cam gear 15 and thence through the coupling lever 22 to the disc ejecting mechanism including the slide member 20. However, when such an irrational external force as interfering the ejection of the disc 12 is exerted during the disc ejection, the power transmission from the worm gear 8 to the cam gear 13 is cut off owing to the slip action between the worm gear 8 and the cam gear 13.

The excess load absorbing mechanism 37 is adapted to cut off the power transmission when experiencing a load in excess of the load in the slip mechanism 10.

With this arrangement, when such an irrational external force as interfering the ejection of the disc 12 is exerted during the ejection thereof, it is possible to prevent damage to various parts of the power transmission route owing to the slip action between the gear 35 and the friction sheet 36.

Figure 5:
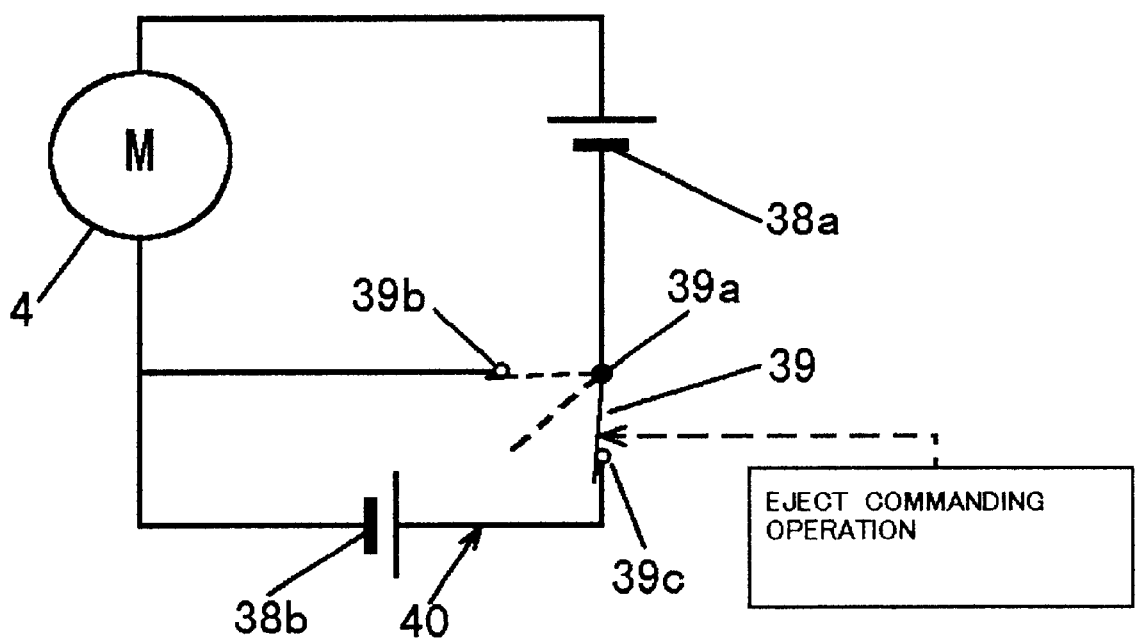
FIG. 5 is a circuit diagram showing another modification of the same embodiment obtained by adding a high voltage supply means to the same embodiment.

FIG. 5 shows a modification of the above embodiment obtained by adding to the same a means for increasing the voltage supplied to the pick-up drive motor 4 only in response to the eject commanding operation. In FIG. 5, parts like those in the above embodiment are designated by like reference numerals or symbols.

Referring to FIG. 5, reference symbols 38a and 38b designate a first and a second power supply source. Reference numeral 39 designates a control switch for controlling the pick-up drive motor 4. The control switch 39 has a first to a third contact 39a to 39c. The first and second power supply sources 38a and 38b and the control switch 39 constitute a high voltage supply means 40.

The pick-up drive motor 4 is connected in series with the first and second contacts 39a and 39b across the first power supply source 38a. The second power supply source 38b is connected between the third and second contact 39b and 39c.

In the disc playback operation, the first and second contacts 39a and 39b of the control switch 39 are connected. In the disc ejecting operation, the first and third switches 39a and 39c of the control switch 39 are connected in response to the eject commanding operation.

A polarity inverting means for switching the direction of rotation of the pick-up drive motor 4 in the disc playback operation is not described.

With the above arrangement, the pick-up drive motor 4 is connected in the disc playback operation across the sole first power supply source 38a. When ejecting the disc, on the other hand, the motor 4 is connected across the series circuit of the first and second power supply sources 38a and 38b, and is thus driven at an increased high speed to permit quick disc ejection.

As has been described in the foregoing, according to the invention the slip mechanism is provided in the first power transmission route leading from the pick-up drive motor to the pick-up, and in the last stage of restoration of the pick-up to the initial position the disc ejecting mechanism is connected to the pick-up drive motor for the disc ejection while the slip mechanism provides the slip action. It is thus possible to obtain a simplified construction of the disc ejecting apparatus.

In addition, the excess load absorbing mechanism for cutting off the power transmission when experiencing a load in excess of the load in the slip mechanism, is provided in the second power transmission route leading from the pick-up drive motor to the disc ejecting mechanism. Thus, when it is intended to irrationally stop the disc ejection, the excess load absorbing mechanism can absorb the pick-up drive motor torque to prevent damage to the system.

Further, the present invention is provided with the high voltage supply means for supplying a high voltage to the pick-up drive motor in response to the eject commanding operation. With this arrangement the pick-up motor can be driven at an increased high speed in the eject commanding operation thereby to enable a quick disc ejection.

What is claimed is:

1. Disc ejecting apparatus for ejecting a disc by a disc ejecting mechanism with a driving force of a pick-up drive motor for reciprocally moving a pick-up, having:

a first gear driven by the driving force of said pick-up drive motor;

a pick-up support for supporting said pick-up;

a second gear for reciprocally moving said pick-up support, said pick-up support being disposed coaxially with said first gear and able to be moved to an end position in which said pick-up is positioned in an initial position;

a friction member inserted between said first and second gears, said friction member transmitting the driving force from the first gear to said second gear and providing a slip action;

a third gear for selectively engaging the first gear and transmitting the driving force of the pick-up drive motor to said disc ejecting mechanism;

a stopper adapted to be in contact with said pick-up support to stop the pick-up to said initial position when the pick-up support is restored to said end position; and a connecting member for supporting said third gear and engaging said third gear with said first gear in response to the movement of the pick-up support in a last stage of restoration of the pick-up to the initial position, thereby to transmit the driving force of the pick-up driving motor to the disc ejecting mechanism, wherein:

after said pick-up is restored to the initial position, said pick-up is held to the initial position by said slip action.

2. The disc ejecting apparatus according to claim 1, wherein:

a high voltage supply means for supplying a high voltage to said pick-up drive motor in response to an eject commanding operation.

3. The disc ejecting apparatus according to claim 1, further having:

an excess load absorbing mechanism located in a route between said third gear and said disc ejecting mechanism, said excess load absorbing mechanism adapted to absorb an excess load when experiencing a load in excess of the load in said slip action of said friction member.

* * * * *